United States Patent
Sun et al.

(10) Patent No.: US 6,658,845 B1
(45) Date of Patent: Dec. 9, 2003

(54) CONTROL STRATEGY USING VARIABLE VALVE ACTUATION TO REDUCE PARTICULATE EMISSION AND IMPROVE DRIVEABILITY DURING TRANSIENT OPERATION OF A TURBOCHARGED DIESEL ENGINE

(75) Inventors: Jinhui Sun, Bloomington, IL (US); Xinqun Gui, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/223,853

(22) Filed: Aug. 20, 2002

(51) Int. Cl.[7] ............................................... F02D 23/00
(52) U.S. Cl. ........................... 60/601; 60/605.1; 60/611
(58) Field of Search ........................... 60/601, 602, 603, 60/605.1, 611; 123/90.15

(56) References Cited

U.S. PATENT DOCUMENTS

| | | | |
|---|---|---|---|
| 4,612,770 A | * | 9/1986 | Tadokoro et al. ............. 60/602 |
| 4,932,372 A | * | 6/1990 | Meneely ................... 123/182.1 |
| 6,354,268 B1 | * | 3/2002 | Beck et al. ................. 123/435 |
| 6,418,720 B1 | * | 7/2002 | Cornell et al. ................ 60/602 |
| 6,434,938 B1 | | 8/2002 | Sun et al. |

* cited by examiner

Primary Examiner—Hoang Nguyen
(74) Attorney, Agent, or Firm—Dennis Kelly Sullivan; Susan L. Lukasik; Jeffrey P. Calfa

(57) ABSTRACT

An internal combustion engine (10) has an intake system (12) that includes a turbocharger (32). An engine control (30) processes data for controlling the opening of the exhaust valves (24) and for controlling fueling of the engine in relation to the engine operating cycle. In response to initiation of engine acceleration, the control increasingly retards exhaust valve opening in relation to the engine operating cycle to cause the turbocharger to increase pressure in the intake manifold (14) and increases engine fueling in relation to the increased pressure in the intake manifold.

5 Claims, 5 Drawing Sheets

CONTROL STRATEGY USING VARIABLE VALVE ACTUATION TO REDUCE PARTICULATE EMISSION AND IMPROVE DRIVEABILITY DURING TRANSIENT OPERATION OF A TURBOCHARGED DIESEL ENGINE

FIELD OF THE INVENTION

This invention relates generally to turbocharged diesel engines that propel motor vehicles and are equipped with variable valve actuation apparatus, and in particular to a control strategy for concurrently reducing particulate emission and increasing engine torque during transient operation of an engine, such as when the engine is being accelerated to accelerate the vehicle.

BACKGROUND AND SUMMARY OF THE INVENTION

A turbocharger is one type of device that is used to supercharge an internal combustion engine. A diesel engine that is supercharged by a turbocharger is sometimes referred to as a turbocharged diesel. A turbocharger comprises a turbine that is powered by engine exhaust gas and coupled by a shaft to operate a compressor that boosts pressure in the engine air intake system downstream of the compressor. Boost is controlled by controlling turbine operation.

A turbocharged diesel engine operating as the prime mover of a motor vehicle can provide certain advantages that are unavailable with other types of vehicle powerplants. For example, increasing boost allows increased fueling of the engine, enabling the engine to develop more torque than without turbocharging. Known devices that enable an engine to deliver increased torque for vehicle acceleration include variable geometry/nozzle turbochargers and superchargers.

A successful strategy for controlling operation of a turbocharged diesel engine in a vehicle should enable the engine to deliver torque appropriate to the manner in which the vehicle is being driven without generating unacceptable levels of tailpipe emissions. Transient operating conditions, like those occurring when a vehicle is accelerating, may have significant influence on tail pipe emission, and so special attention may have to be given to engine operation during those events to assure compliance with applicable emission limits. Attainment of that objective at the expense of compromising engine torque would be undesirable.

Certain commonly assigned patent applications of the inventors have disclosed that certain turbocharged diesel engines, especially engines that have variable valve actuation, can develop increased torque without undesirable consequences on tailpipe emissions, such as smoke in the engine exhaust. That improvement is achieved by certain conjunctive control of: 1) timing at which the engine intake and/or exhaust valves open during an engine operating cycle; and 2) engine fueling.

The present invention concerns a discovery that enables such an engine to develop increased engine torque during transient operation, such as during acceleration, without unacceptable effect on tailpipe emissions, especially particulate emissions.

Because certain principles of the present invention include changing the time in the engine operating cycle when the exhaust valves open, the engine must have an appropriate mechanism for each exhaust valve. An example of such a mechanism comprises an electric actuator for opening and closing an exhaust valve in accordance with an electric signal applied to the actuator. Such an engine is sometimes referred to as a camless engine, particularly where the engine intake valves are also controlled by electric actuators. When the inventive strategy is invoked, the timing of the opening of each exhaust valve during the engine cycle is increasingly retarded.

By retarding exhaust valve opening, the in-cylinder burning time for particulates is increased, and this reduces particulate emission. Retarding the exhaust valve opening has also been discovered to provide increased energy input to the turbocharger compressor, thereby increasing boost. As boost increases and smoke decreases, engine fueling is also increased to develop increased engine torque so that the additional fueling is not adverse to tailpipe emissions in any significant way. In this way, the turbocharger is forced toward operating at its performance limit, thereby enabling the engine to develop a corresponding torque that is greater than the torque that would otherwise be achieved.

If a consequence of retarding exhaust valve opening in conjunction with increasing engine fueling creates incipient turbocharger surging, bleeding charge air according to the inventors' prior disclosure, may be employed to counteract, or prevent, the incipient surging. Because a turbocharger is typically designed with high speed, rather than low speed, operation in mind, surging may be a concern only during an early portion of the acceleration time when turbocharger speed is still relatively low.

A primary aspect of the present invention relates to a novel strategy for controlling exhaust valve opening in a turbo-diesel engine that has a variable valve actuation apparatus. When the engine is being accelerated, the engine control system causes the exhaust valves to open at a later time during the engine cycle than they would in an engine that has a camshaft operating the exhaust valves. The extent to which the control system retards exhaust valve opening is a function of one or more variables that, for example, are used as inputs to a look-up table to yield values for controlling exhaust valve opening.

The disclosed strategy is implemented via a processor-based engine control. The data is processed according to a software algorithm that is executed by the processor to develop data for a control signal that is applied to the exhaust valve actuators to control exhaust valve timing. Engine fueling is also increased, consistent with increasing turbocharger boost to enable the engine to develop increasing torque consistent with limiting particulate tailpipe emissions.

One general aspect of the claimed invention relates to an internal combustion engine comprising an intake system through which charge air is delivered to an intake manifold of the engine, including a turbocharger that comprises a compressor operated by exhaust gases from the engine for creating compressed charge air that provides boost in the intake manifold. A control controls the opening of engine exhaust valves in relation to an engine operating cycle and fueling of the engine in relation to the engine operating cycle. During transient operation of the engine, the control increasingly retards exhaust valve opening in relation to the engine operating cycle to cause the turbocharger to increase intake manifold pressure and increases engine fueling in relation to the increased intake manifold pressure.

Another general aspect of the claimed invention relates a method for an engine as just described wherein in response to initiation of transient operation of the engine, exhaust valve opening is increasingly retarded in relation to the engine operating cycle to cause the turbocharger to increase intake manifold pressure and engine fueling is increased in relation to the increased intake manifold pressure.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
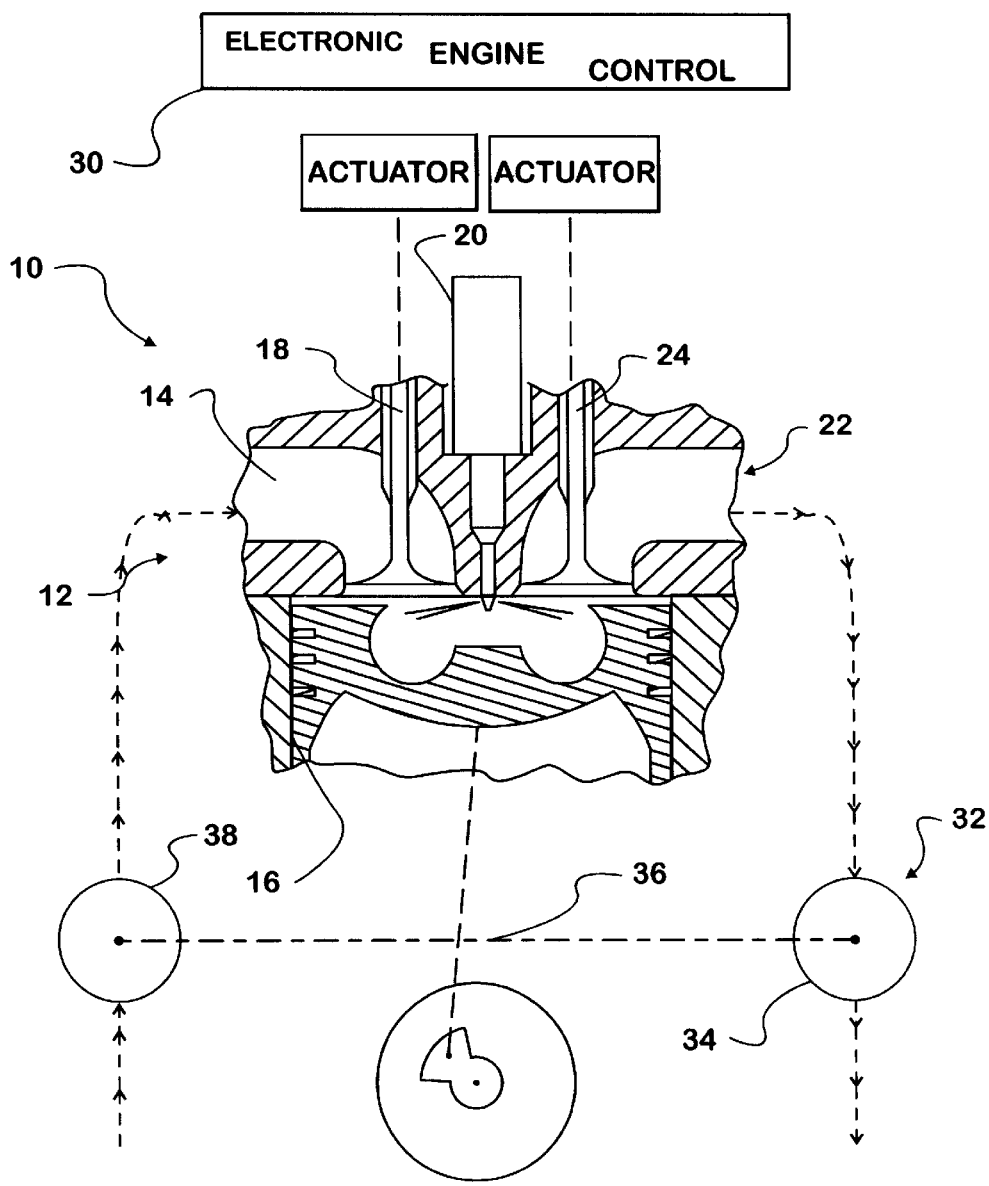
FIG. 1 is a general schematic diagram of an engine, in accordance with principles of the present invention.

FIG. 1 illustrates an internal combustion engine 10 that powers a motor vehicle. An example of such a vehicle is a truck having a chassis containing a powertrain in which engine 10 is a fuel-injected turbocharged diesel engine operatively coupled through a drivetrain to driven wheels for propelling the vehicle. The engine has variable valve actuation that allows the time of exhaust valve opening to be controlled according to engine operation.

Engine 10 comprises an intake system 12 through which charge air is delivered to an intake manifold 14 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24.

Engine 10 may be a camless engine, meaning one where each of the normally closed intake and exhaust valves is opened at the proper time in the engine operating cycle by applying an electric signal to a respective electric actuator.

An electronic engine control 30 that possesses digital processing capability is associated with engine 10. Control 30 may comprise one or more processors that process data from various input data signal sources in accordance with programmed algorithms to develop certain data for signals used in the performance of various functions associated with operation of engine 10. The data processed by control 30 may originate at external sources (input variables) and/or be generated internally of control 30 (local variables). Control 30 develops the data for the signals that operate the intake and exhaust valve actuators and for the signals that operate fuel injectors 20.

Turbocharging of engine 10 is accomplished by a turbocharger 32 which comprises a turbine 34 connected in exhaust system 22 coupled via a shaft 36 to a compressor 38 connected in intake system 12. Compressor 38 is operated by exhaust gases from engine 10 that act on turbine 34 to create compressed charge air that provides boost in intake manifold 14.

Figure 2:
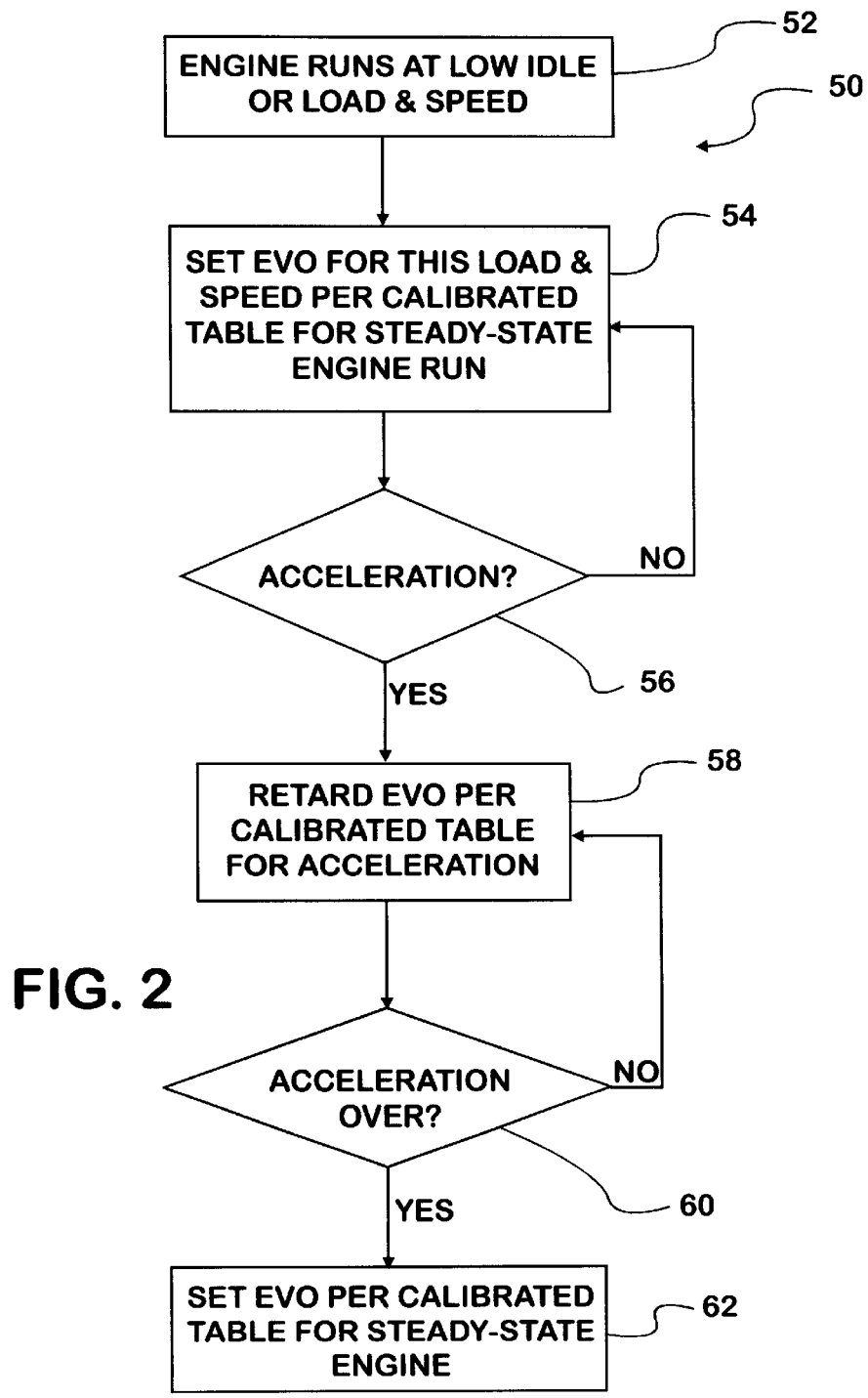
FIG. 2 is a flow diagram of an algorithm used in practicing the invention.

Engine control 30 contains a software program that implements an algorithm for control of engine fueling via fuel injectors 20 and control of exhaust valves 24. That algorithm is presented in FIG. 2 where it is designated by the reference numeral 50.

When engine 10 is running in a generally steady state mode of operation at low idle speed, or at a low running speed and low load, as represented by block 52, algorithm 50 determines an appropriate value for the timing of engine exhaust valve opening (EVO). The determination may be made either by real time processing of certain relevant variables or via a look-up table pre-programmed with predetermined EVO timing values based on relevant variables. Block 54 represents that determination.

An acceleration request is detected by a step represented by block 56. The acceleration request may come from any suitably appropriate source, such as accelerator pedal position sensor. As long as the algorithm continues to detect the absence of an acceleration request, the steady state operation is presumed to continue in accordance with block 52. Once the algorithm detects an acceleration request, engine control 30 acts to change EVO timing according to the inventive strategy, as represented by block 58.

For changing EVO timing, engine control 30 may either process certain relevant variables in real time to yield values for increasingly retarding EVO in a manner appropriate to the nature of the acceleration request, or it may obtain values for increasingly retarding EVO in a manner appropriate to the nature of the acceleration using a look-up table pre-programmed with predetermined EVO timing values based on the relevant variables.

Concurrent with performance of the step represented by block 58, engine control 30 increases engine fueling in accordance with the increased boost resulting from retarding the timing of exhaust valve opening. The increased fueling increases engine torque while maintaining a desired fuel-air ratio appropriate for compliance with relevant tailpipe emission limits. The step represented by block 58 repeats until a step 60 of the algorithm detects discontinuance of the acceleration request.

Upon such discontinuance, engine 10 will be in the process of resuming a generally steady state mode of operation, but at a higher speed than before the acceleration. The timing of engine exhaust valve opening (EVO) is now determined by algorithm 50 determining an appropriate value for the EVO timing, either by real time processing of certain relevant variables or via a look-up table pre-programmed with predetermined EVO timing values based on the relevant variables. Block 62 represents that determination. Engine fueling is also adjusted as appropriate.

Figure 3:
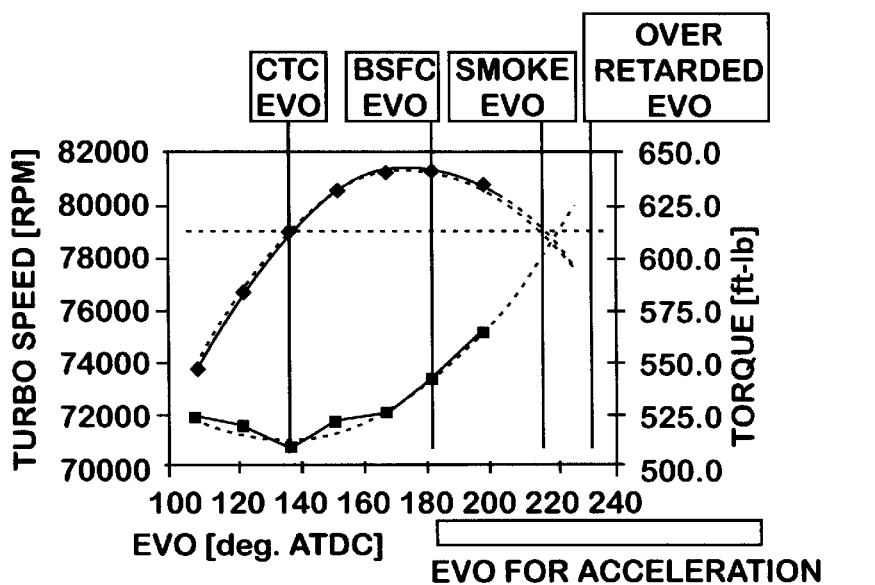
FIGS. 3–7 are various graphs relating to the invention.

FIG. 3 comprises a plot 130 defining a relationship of engine torque to the time during the engine cycle at which the exhaust valves begin to open, as measured in degrees of engine crankshaft rotation after top dead center (ATDC). It also comprises a second plot 132 defining a relationship of turbocharger speed to the time at which the exhaust valves begin to open. Four different timings of EVO are defined: CTC EVO; BSFC EVO; Smoke EVO; and Over-retarded EVO. Each of these four timings serves to define a respective plot in each of FIGS. 4–7.

CTC EVO represents a baseline condition where the exhaust valve opening occurs close to the time that it would on an engine that does not have variable valve actuation. BSFC EVO represents a condition where the exhaust valve opening occurs at a timing that provides minimum BSFC. Smoke EVO represents timing that produces the same torque as at CTC EVO. Over-retarded EVO represents timing that provides least smoke.

Figure 4:
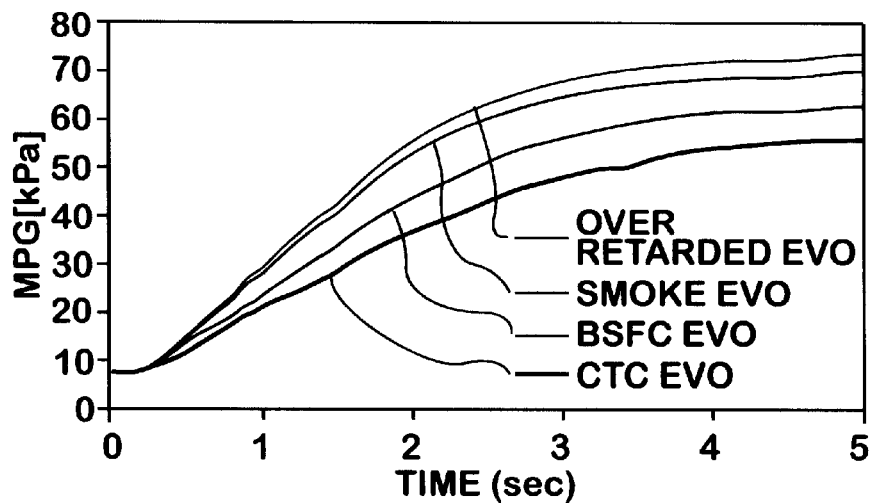
Figure 5:
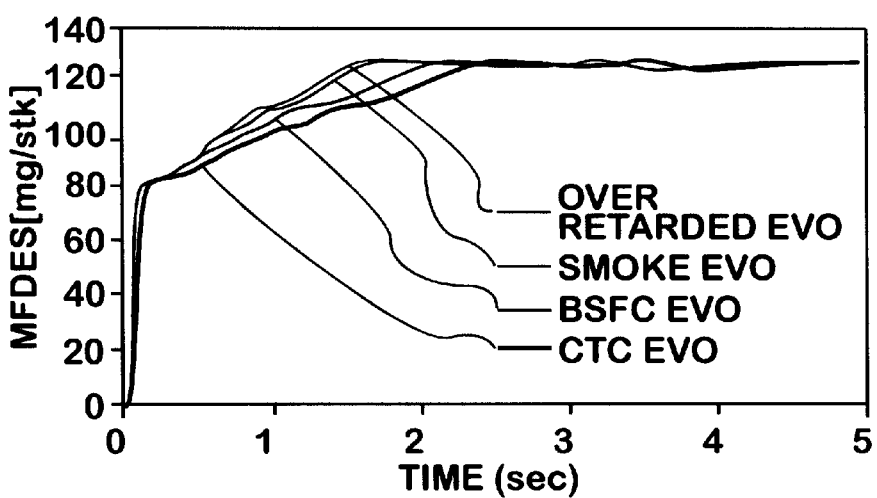
Figure 6:
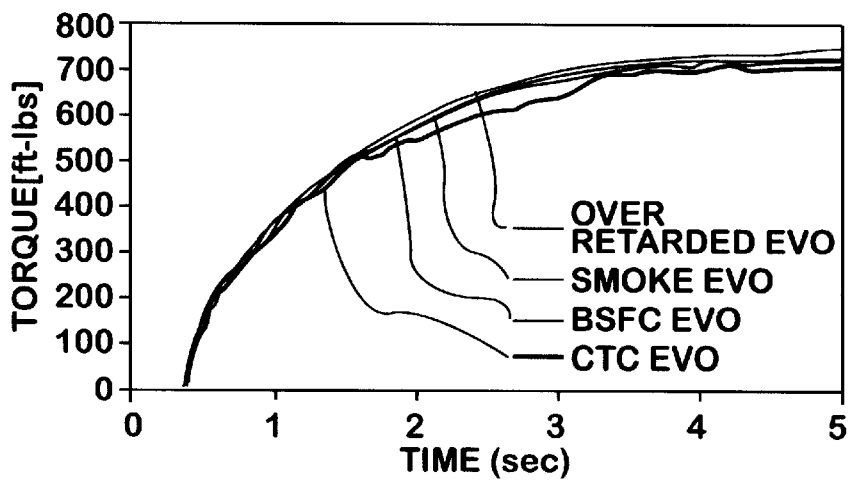
Figure 7:
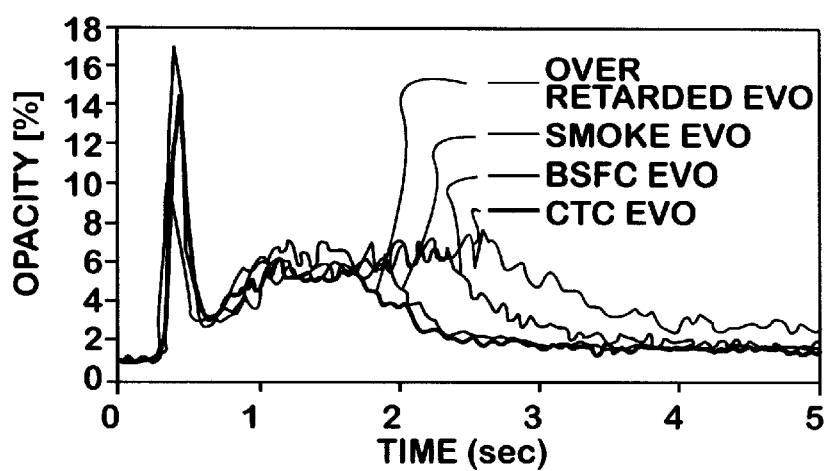

FIG. 4 shows four plots, each for a particular one of the four different timings, showing turbocharger boost as a function of time during an acceleration. At zero time with the engine running at 1000 rpm, the accelerator pedal position sensor is instantaneously-operated from 0% to 100%. FIG. 5 shows four plots, each for a particular one of the four different timings, showing fueling as a function of time during the same acceleration. FIG. 6 shows four plots, each for a particular one of the four different timings, showing torque as a function of time during the same acceleration. FIG. 7 shows four plots, each for a particular one of the four different timings, showing smoke opacity as a function of time during the same acceleration.

While a presently preferred embodiment of the invention has been illustrated and described, it should be appreciated that principles of the invention are applicable to all embodiments and uses that fall within the scope of the following claims.

What is claimed is:

1. An internal combustion engine comprising:

an intake system through which charge air is delivered to an intake manifold of the engine, including a turbocharger that comprises a compressor operated by exhaust gases from the engine for delivering compressed charge air into the intake manifold;

exhaust valves that are normally closed but open to allow the exhaust gases to exit combustion chambers of the engine;

a control for controlling the opening of the exhaust valves in relation to an engine operating cycle and for controlling fueling of the engine in relation to the engine operating cycle;

wherein, in response to initiation of transient operation of the engine, the control increasingly retards exhaust valve opening in relation to the engine operating cycle to cause the turbocharger to increase pressure in the intake manifold and increases engine fueling in relation to the increased pressure in the intake manifold.

2. An internal combustion engine as set forth in claim 1 in which the transient operation comprises acceleration of the engine, and the control increasingly retards exhaust valve opening in relation to the engine operating cycle to cause the turbocharger to increase pressure in the intake manifold and increases engine fueling in relation to the increased pressure in the intake manifold as the engine continues to accelerate.

3. An internal combustion engine as set forth in claim 1 in which the engine operating cycle comprises a compression ignition operating cycle.

4. A method of operating an internal combustion engine that comprises:

an intake system through which charge air is delivered to an intake manifold of the engine, including a turbocharger that comprises a compressor operated by exhaust gases from the engine for delivering compressed charge air into the intake manifold and exhaust valves that are normally closed but open to allow the exhaust gases to exit combustion chambers of the engine;

the method comprising:

in response to initiation of transient operation of the engine, increasingly retarding exhaust valve opening in relation to the engine operating cycle to cause the turbocharger to increase pressure in the intake manifold, and increasing engine fueling in relation to the increased pressure in the intake manifold.

5. A method as set forth in claim 4 in which the transient operation comprises acceleration of the engine, and the step of increasingly retarding exhaust valve opening in relation to the engine operating cycle to cause the turbocharger to increase pressure in the intake manifold and increasing engine fueling in relation to the increased pressure in the intake manifold is performed in response to initiation of engine acceleration.

* * * * *